(12) United States Patent
Stopa et al.

(10) Patent No.: US 10,855,858 B1
(45) Date of Patent: Dec. 1, 2020

(54) METHOD AND SYSTEM FOR SALES RECOMMENDATIONS WITH GRAPHICAL ANALYSIS OF MULTIFUNCTIONAL PRINTER AND CUSTOMER DATA USING DEMOGRAPHIC, ECONOMIC, MULTIFUNCTIONAL PRINTER USAGE CHARACTERISTICS

(71) Applicant: Konica Minolta Business Solutions U.S.A., Inc., Ramsey, NJ (US)

(72) Inventors: Michael Stopa, San Mateo, CA (US); Karsten Bruening, San Mateo, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 0 days.

(21) Appl. No.: 16/457,350

(22) Filed: Jun. 28, 2019

(51) Int. Cl.
  *H04N 1/00* (2006.01)
  *G06N 3/08* (2006.01)
  *G06F 3/12* (2006.01)

(52) U.S. Cl.
  CPC .......... *H04N 1/00501* (2013.01); *G06N 3/08* (2013.01); *H04N 1/00466* (2013.01); *G06F 3/1229* (2013.01); *H04N 1/00477* (2013.01); *H04N 2201/0094* (2013.01)

(58) Field of Classification Search
  None
  See application file for complete search history.

(56) References Cited

U.S. PATENT DOCUMENTS

| | | | |
|---|---|---|---|
| 2002/0049839 A1* | 4/2002 | Miida | G06F 11/3013 709/224 |
| 2016/0155129 A1* | 6/2016 | Ono | G06Q 30/0202 705/7.31 |
| 2018/0276710 A1 | 9/2018 | Tietzen et al. | |

OTHER PUBLICATIONS

Berg et al., "Graph Convolutional Matrix Completion", arXiv:1706.02263v2 [stat.ML], Oct. 25, 2017, 9 pages.
(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

A method, a non-transitory computer readable medium, and a system are disclosed for recommending products based on usage of one or more multifunctional printers. The method includes collecting usage data from a multifunctional printer; classifying the usage data from the multifunctional printer into one or more categories; comparing the usage data from the multifunctional printer in each of the one or more categories to usage data from one or more other multifunctional printers; determining one or more usage patterns for the multifunctional printer from the comparison of the usage data between the multifunctional printer in each of the one or more categories to the usage data from one or more other multifunctional printers; identifying one or more products or services based on the one or more usage patterns for the multifunctional printer; and recommending one or more products or services for the multifunctional printer on a graphical user interface (GUI).

20 Claims, 11 Drawing Sheets

(56) References Cited

OTHER PUBLICATIONS

Fan et al., "Graph Neural Networks for Social Recommendation", arXiv:1902.07243v1 [cs.IR], Feb. 19, 2019, 11 pages.
Peng et al., "Link Prediction ion Social Networks: the State-of-the-Art", Art, arXiv:1411.5118v2 [cs.SL]; Dec. 8, 2014, 38 pages.

* cited by examiner

METHOD AND SYSTEM FOR SALES RECOMMENDATIONS WITH GRAPHICAL ANALYSIS OF MULTIFUNCTIONAL PRINTER AND CUSTOMER DATA USING DEMOGRAPHIC, ECONOMIC, MULTIFUNCTIONAL PRINTER USAGE CHARACTERISTICS

FIELD OF THE INVENTION

The present disclosure relates to a method and system for sales recommendations with graphical analysis of printers or multifunctional printers (MFPs) and customer data associated with the printers or multifunctional printers.

BACKGROUND OF THE INVENTION

Techniques of machine learning for data of a graph structure are known. For example, techniques include extracting a graph with a data set, inputting the graph to a neural network, and causing learning of a learning model to output a result.

SUMMARY OF THE INVENTION

It would be desirable to have a method and system having a machine learning computational system for analyzing data from printers, for example, from multifunctional printers (MFP) in combination with customer data to recommend sales targets, which is based on a graph based machine learning computation system, and which can recommend printer upgrades or other products to customers or businesses, for example, small to medium-sized businesses (SMBs).

In accordance with an exemplary embodiment, it would be desirable to use a neural network to generate a recommendation for customers or businesses, for example, small to medium-sized businesses (SMB) using a computational method with usage data from, for example, a multifunctional printer to identify needs of those consumers which can then inform targeted advertising or sales activity to provide products to satisfy those needs.

In accordance with an exemplary embodiment, a method is disclosed for recommending products based on usage of one or more multifunctional printers, the method comprising: collecting usage data from a multifunctional printer; classifying the usage data from the multifunctional printer into one or more categories; comparing the usage data from the multifunctional printer in each of the one or more categories to usage data from one or more other multifunctional printers; determining one or more usage patterns for the multifunctional printer from the comparison of the usage data between the multifunctional printer in each of the one or more categories to the usage data from one or more other multifunctional printers; identifying one or more products or services based on the one or more usage patterns for the multifunctional printer; and recommending one or more products or services for the multifunctional printer based on the identified one or more products or services through a graphical user interface (GUI).

In accordance with another exemplary embodiment, a non-transitory computer readable medium (CRM) storing computer program code executed by a computer processor that performs a process for recommending products based on usage of one or more multifunctional printers is disclosed, the process comprising: collecting usage data from a multifunctional printer; classifying the usage data from the multifunctional printer into one or more categories; comparing the usage data from the multifunctional printer in each of the one or more categories to usage data from one or more other multifunctional printers; determining one or more usage patterns for the multifunctional printer from the comparison of the usage data between the multifunctional printer in each of the one or more categories to the usage data from one or more other multifunctional printers; identifying one or more products or services based on the one or more usage patterns for the multifunctional printer; and recommending one or more products or services for the multifunctional printer based on the identified one or more products or services through a graphical user interface (GUI).

In accordance with an exemplary embodiment, a system is disclosed for recommending products based on usage of one or more multifunctional printers, the system comprising: one or more multifunctional printers, one of the one or more multifunctional printers having a processor configured to: collect usage data from a multifunctional printer; classify the usage data from the multifunctional printer into one or more categories; compare the usage data from the multifunctional printer in each of the one or more categories to usage data from one or more other multifunctional printers; determine one or more usage patterns for the multifunctional printer from the comparison of the usage data between the multifunctional printer in each of the one or more categories to the usage data from one or more other multifunctional printers; and identify one or more products or services based on the one or more usage patterns for the multifunctional printer; and a graphical user interface configured to display a recommendation of one or more products or services for the multifunctional printer based on the identified one or more products or services.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
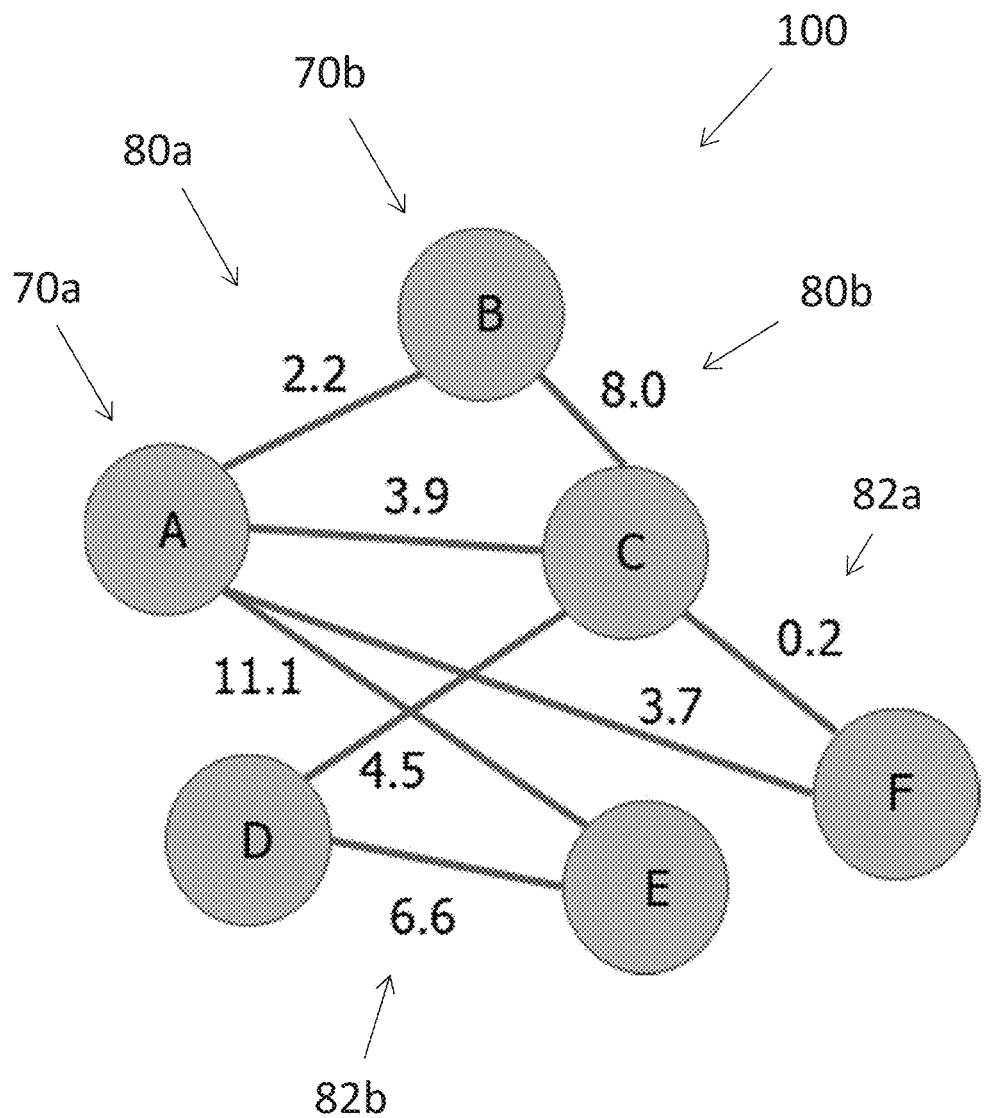
FIG. 1 is an illustration of a plurality of nodes, and links between the plurality of nodes in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

It would be desirable to have a method and system for analyzing data from a plurality of printers or multifunctional printer (MFPs) in combination with customer data to recommend sales targets, for example, for printer upgrades, products required for operation of the multifunctional printer, for example, toner, print media or paper, parts, or recommendations for service, for example, for a service technician to replace parts on the printer or MFP for improved functionality of the printer or multifunctional printer. In accordance with an exemplary embodiment, the method and system for analyzing data from the plurality of multifunctional printers (MFPs) can be a graph based machine learning computational system for analyzing data, for example, from a Konica Minolta® multifunctional printers (MFP) in combination with customer data to recommend sales targets for printer upgrades or other product, such as a Workplace Hub® (WPH) or Enterprise Content Management® (ECM) system sold by Konica Minolta.

In accordance with an exemplary embodiment, the method and system as disclosed can be configured as a recommendation system, which can evaluate a customer or business, for example, small and medium-sized businesses (SMBs) in terms of their multifunctional printer (MFP) or printer usage based on their statistics and related company data (for example, size of company or business, location, industry, etc.) and determine which of the one or more small and medium-sized businesses (SMBs) are most suitable or in need of upgrade of printing capacity or in need of other products sold, for example, by Konica Minolta®. For example, a business with 100 or fewer employees can be considered a small business, and a business with 100 to 999 employees can be considered as a medium sized business.

In accordance with an exemplary embodiment, a graphical database and machine learning system is disclosed as shown in FIG. 1 that casts the consumers and products as nodes (or customer nodes) 70*a*, 70*b* on a graph and predicts links 80*a*, 80*b* between consumers and products 90*a*, 90*b* (FIG. 10) and corresponding needs of customers and/or consumers of products and/or services.

In accordance with an exemplary embodiment, the method and system as disclosed herein can be configured to analyze usage patterns of a plurality of multifunctional printers (MFPs) or printers, or other IoT devices found in a typical office, for example, a small to medium-sized business, in combination with generic or static data about business customers to determine when a printer upgrade or purchase of other products such as different type of printer is most likely to be beneficial to the business customer. For example, in accordance with an exemplary embodiment, the method and system can use the purchase patterns from business customers (who have, for example, previously purchased a particular item) as ground truth data and evaluate, with a graphical machine learning technique, under what set of circumstances business consumers (who have not yet bought the particular item) are likely to want and benefit from a same or a similar purchase.

FIG. 1 is an illustration of a plurality of nodes 70*a*, 70*b*, and links 80*a*, 80*b*, between the plurality of nodes 70*a*, 70*b* in accordance with an exemplary embodiment. As shown in FIG. 1, in accordance with an exemplary embodiment, a collection of nodes 70*a*, 70*b* (interchangeably called "vertices") and links 80*a*, 80*b* (interchangeably called "edges") where both nodes 70*a*, 70*b*, and links 80*a*, 80*b*, may have features. For example, a node 70*a*, 70*b* may represent a company (a small or medium size business customer, for example, a small or medium sized business customer of Konica Minolta) and the features can include a corresponding industry of the customer, number of employees, and geographic location of the customer. The links 80*a*, 80*b*, which can be directed or undirected, represent relationships between the nodes 70*a*, 70*b*, and may be given by a strength (a real number) showing the closeness of that relationship.

Figure 2:
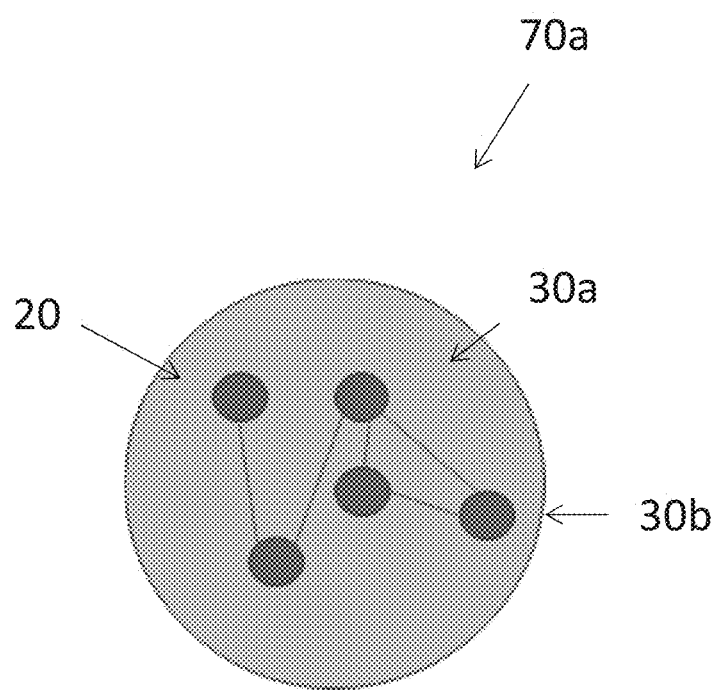
FIG. 2 is illustration of node having a plurality of "subnodes" thereby forming a "composite node", and wherein in this instance the nodes are identified as small to medium-sized businesses (SMBs) and the sub-nodes are the multifunctional printers (MFPs) that are owned by the SMB in accordance with an exemplary embodiment.

FIG. 2 is an illustration of a node 70*a* which can be, for example, a SMB having a plurality of sub-nodes 30*a*, 30*b*, which can be, for example, multifunctional printers (MFPs) in accordance with an exemplary embodiment. In this disclosure, "composite nodes" are nodes of one type within nodes of another type. One specific case which is where the inner nodes represent internet of things (IoT) devices 20, specifically, for example, printers 30*a*, 30*b*, (also referred to as multifunctional printers MFPs) and/or finishers of varying types, which are, for example, owned and/or leased by the outer node 70*a*, which can be a small or medium size business (SMB).

Figure 3:
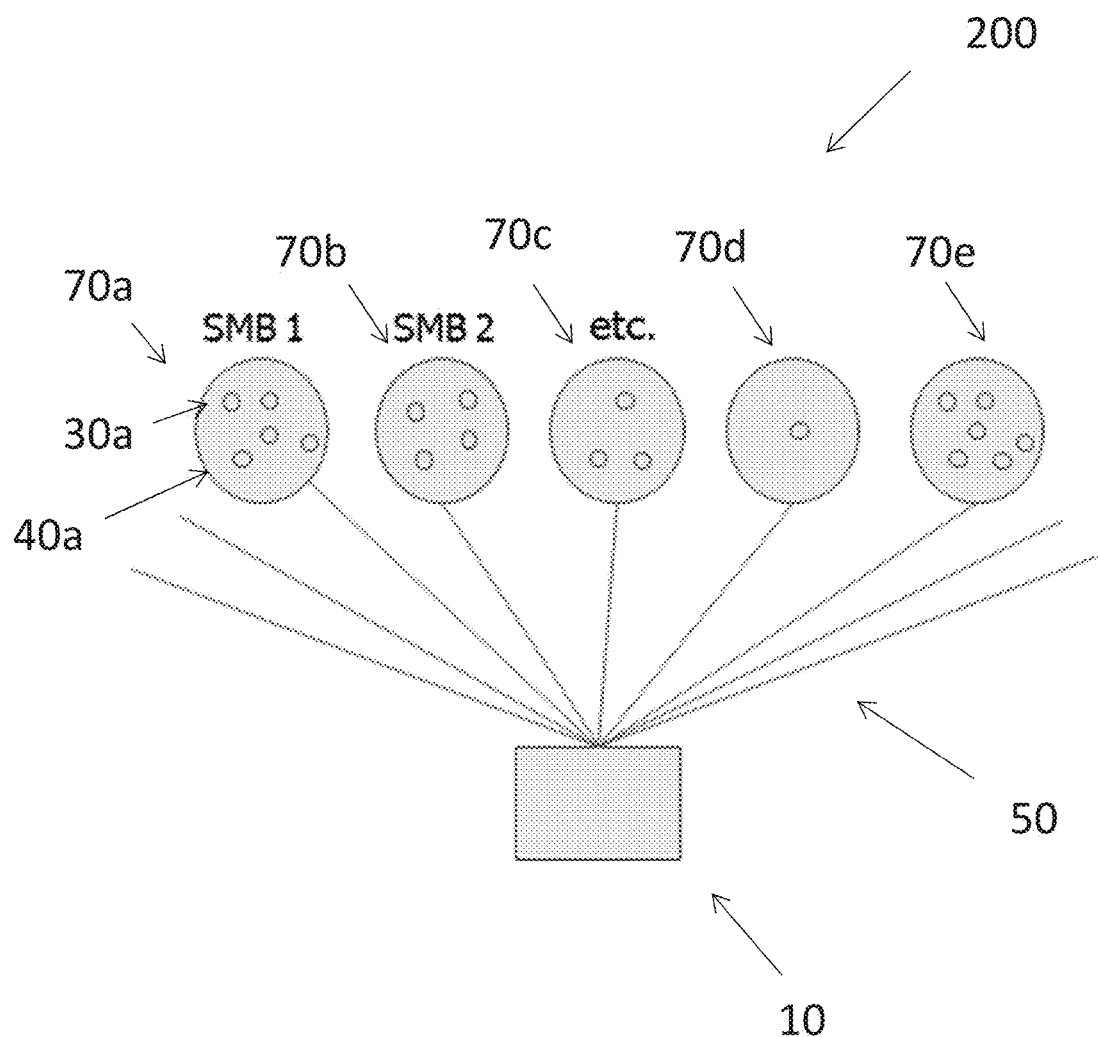
FIG. 3 is an illustration of a system for sales recommendations (or recommender system) from a plurality of small and medium size businesses (SMBs) in accordance with an exemplary embodiment.

FIG. 3 is an illustration of a system 200 for sales recommendations (or recommender system) from a plurality of nodes 70*a*, 70*b*, for example, a plurality of small to medium sized businesses (SMBs) in accordance with an exemplary embodiment. As shown in FIG. 3, the system 200 includes a plurality of nodes 70*a*, 70*b*, and wherein each of the plurality of composite nodes 70*a*, 70*b* includes one or more printers or multifunctional printers (MFPs) 30*a*, 30*b*, and/or one or more finishers 40*a*, 40*b*. In accordance with an exemplary embodiment, the one or more printers or multifunctional printers (MFPs) 30*a*, 30*b*, and the one or more finishers 40*a*, 40*b*, can be, for example, in a company or business 70*a*, 70*b*, for example, a print shop or small to medium-sized business (SMB) which are in connected to a server or client 10 via a communication network 50. The communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, each of the one or more server or client devices 10, can be, for example, a personal computer (PC), a laptop, a mobile computing device (e.g., tablet PC, smartphone, etc.), a server, a mainframe, or a kiosk. As shown in FIG. 3, each of the one or more servers or client devices 10, the one or more printers or multifunctional printers (MFPs) 30a, 30b, and the one or more finishers 40a, 40b, can be connected to each other by one or more communication networks 50 of any size having wired and/or wireless segments.

Figure 4:
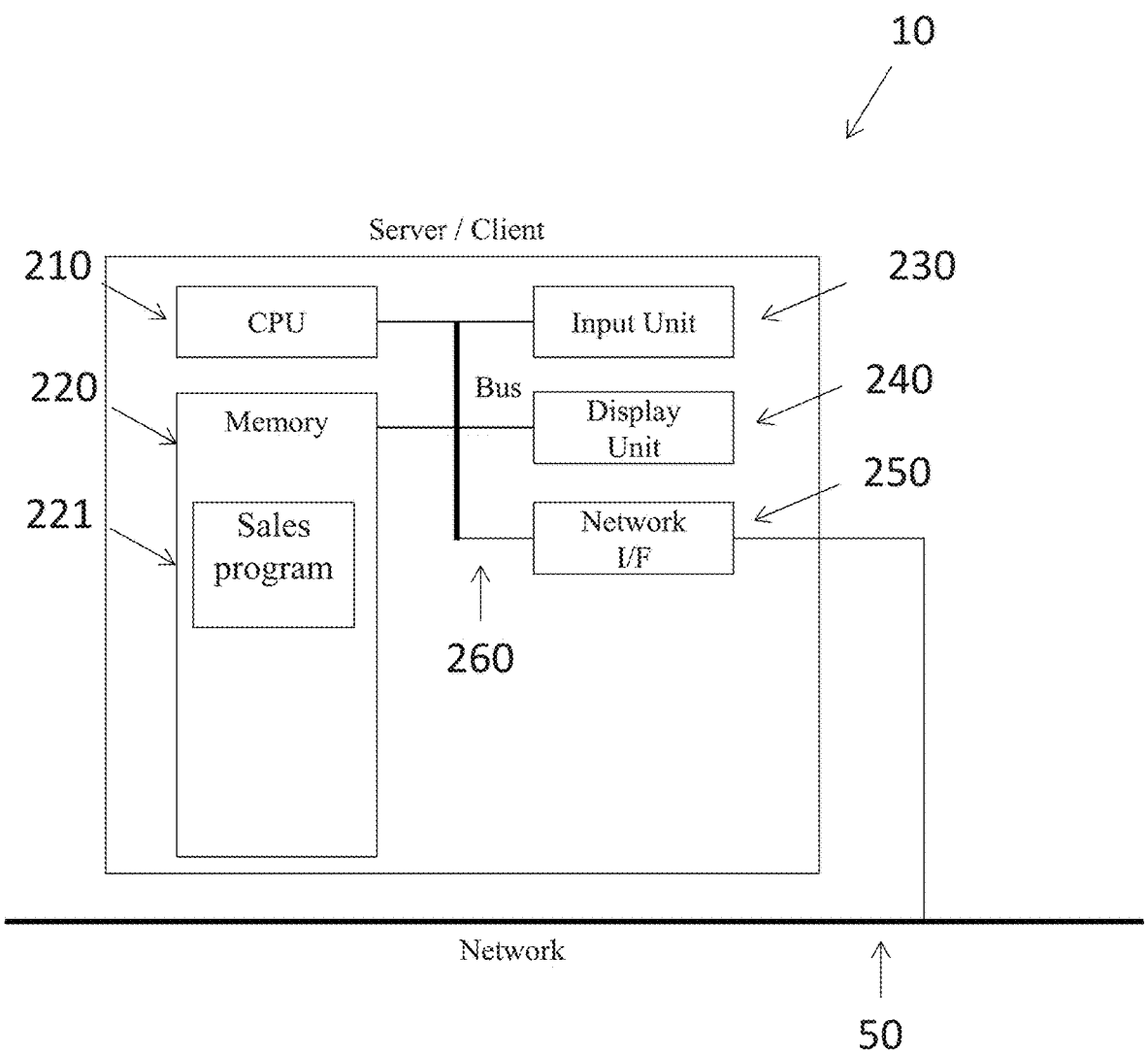
FIG. 4 is an illustration of a server or client device in accordance with an exemplary embodiment.

FIG. 4 is an illustration of a server or client device 10 in accordance with an exemplary embodiment. As shown in FIG. 4, each of the one or more servers 10 can include a processor or central processing unit (CPU) 210, and one or more memories 220 for storing software programs and data, which can include, for example, a sales recommendation program (or sales engine) 221 as disclosed herein. As disclosed, the sales recommendation program (or sales engine) 221 is configured to identify one or more products or services based on the one or more usage patterns for the multifunctional printer, and recommend one or more products or services for the multifunctional printer based on the identified one or more products or services through a graphical user interface (GUI).

In accordance with an exemplary embodiment, the server or client device 10 can be configured to receive usage data from each of the one or more printers or multifunctional printers (MFPs) 30a, 30b, and/or the one or more finishers 40a, 40b within each of the plurality of nodes 70a, 70b.

In accordance with an exemplary embodiment, the usage data is preferably obtained directly from the one or more printers or multifunctional printers (MFPs) 30a, 30b, and/or the one or more finishers 40a, 40b from jobs executed on the one or more printers or multifunctional printers (MFPs) 30a, 30b, and/or the one or more finishers 40a, 40b. The usage data can be sent to the server or client 10, for example, in real time (i.e., at the actual time during which the process or event occurs), or alternatively, the usage data can be saved in the memory of the one or more printers or multifunctional printers (MFPs) 30a, 30b, and/or the one more or finishers 40a, 40b, and retrieved at a later time, for example, by a service technician.

In accordance with an exemplary embodiment, the processor or CPU 220 is configured to carry out the instructions of a computer program, which operates and/or controls at least a portion of the functionality of the server or client device 10. The server or client device 10 can also include an input unit 230, a display unit or graphical user interface (GUI) 240, and a network interface (I/F) 250, which is connected to a communication network (or network) 50. A bus 260 can connect the various components 210, 220, 230, 240, and 250 within the server 10. The server 10 can include an operating system (OS), which manages the computer hardware and provides common services for efficient execution of various software programs as disclosed herein.

Figure 5:
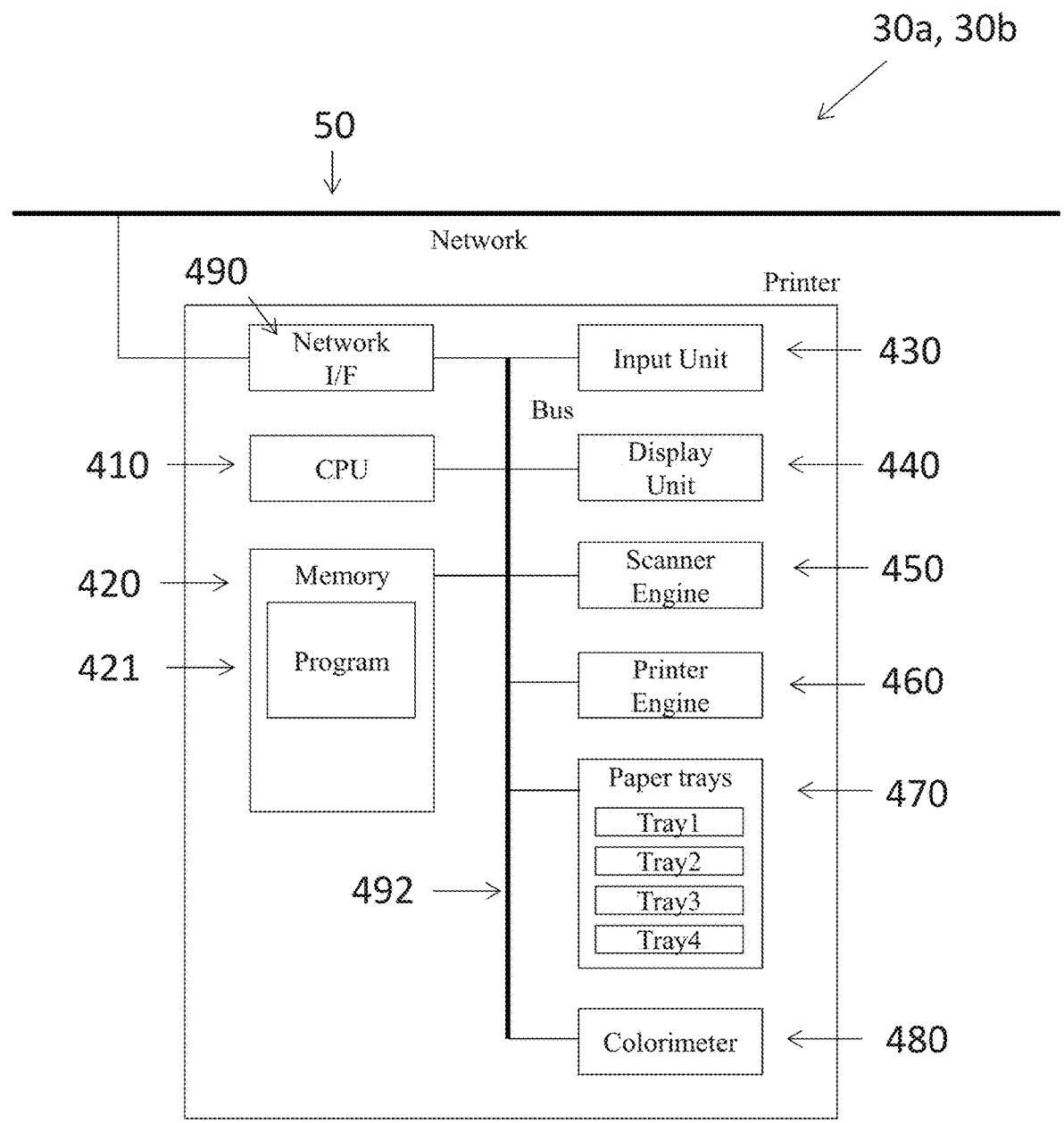
FIG. 5 is an illustration of a printer or a multifunctional printer (MFP) in accordance with an exemplary embodiment.

FIG. 5 is an illustration of a printer or a multifunctional printer 30a, 30b in accordance with an exemplary embodiment. As shown in FIG. 5, the printer or the multifunctional printer 30a, 30b can include a network interface (I/F) 490, which is connected to the communication network (or network) 50, a processor or central processing unit (CPU) 410, and one or more memories 420 for storing software programs and data (such as files to be printed) 421. For example, the software programs 421 can include a printer controller and a tray table. The processor or CPU 410 carries out the instructions of a computer program, which operates and/or controls at least a portion of the functionality of the printer or the multifunctional printer 30a, 30b. The printer or the multifunctional printer 30a, 30b can also include an input unit 430, a display unit or graphical user interface (GUI) 440, a scanner engine (or scanner) 450, a printer engine 460, a plurality of paper trays 470, and a colorimeter 480.

In accordance with an exemplary embodiment, the colorimeter 480 can be an inline colorimeter (ICCU) (or spectrophotometer), which measures printed color patches in order to generate color profiles. In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 492 can connect the various components 410, 420, 430, 440, 450, 460, 470, 480, and 490 within the multifunctional printer 30a, 30b. The printer or multifunctional printer (MFP) 30a, 30b also includes an operating system (OS), which manages the computer hardware and provides common services for efficient execution of various software programs. In accordance with an exemplary embodiment, it can be within the scope of the disclosure for the printer or multifunctional printer 30a, 30b to be a copier.

For example, in accordance with an exemplary embodiment, an image processing section within the printer or multifunctional printer 30a, 30b can carry out various image processing under the control of a print controller or CPU 410, and sends the processed print image data to the print engine 460. The image processing section can also include a scanner section (scanner engine 450) for optically reading a document, such as an image recognition system. The scanner section receives the image from the scanner engine 450 and converts the image into a digital image. The print engine 460 forms an image on a print media (or recording sheet) based on the image data sent from the image processing section. The central processing unit (CPU) (or processor) 410 and the memory 420 can include a program for RIP processing (Raster Image Processing), which is a process for converting print data included in a print job into Raster Image data to be used in the multifunctional printer or print engine 460. The CPU 410 can include a printer controller configured to process the data and job information received from the server or client 10, for example, received via the network connection unit and/or input/output section (I/O section) 490.

The CPU 410 can also include an operating system (OS), which acts as an intermediary between the software programs and hardware components within the multifunctional printer. The operating system (OS) manages the computer hardware and provides common services for efficient execution of various software applications. In accordance with an exemplary embodiment, the printer controller can process the data and job information received from the server or client 10 to generate a print image.

In accordance with an exemplary embodiment, the network I/F 490 performs data transfer with the server or client 10. The printer controller can be programmed to process data and control various other components of the multifunctional printer to carry out the various methods described herein. In accordance with an exemplary embodiment, the operation of printer section commences when the printer section receives a page description from the server or client 10 via the network I/F 490 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of the printers and multifunctional printers 30a, 30b consistent with exemplary embodiments of the disclosure include, but are not limited to, a multifunctional printer, a multi-function peripheral, a laser beam printer (LBP), an LED printer, a multi-function laser beam printer including copy function.

In accordance with an exemplary embodiment, the printer or multifunctional printer 30a, 30b can also include at least one auto tray or paper tray 470, and more preferably a plurality of auto trays or paper trays. Each auto tray or paper tray 470 can include a bin or tray, which holds a stack of a print media (not shown), for example, a paper or a paper-like product. The printer engine or print engine 460 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, lab-Color, etc. In order to maximize print quality, the print media attributes of each type of print media should be input into or hosted on the printer or multifunctional printer 30a, 30b, for example, on printer configuration settings of the printer or multifunctional printer 30a, 30b to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 6:
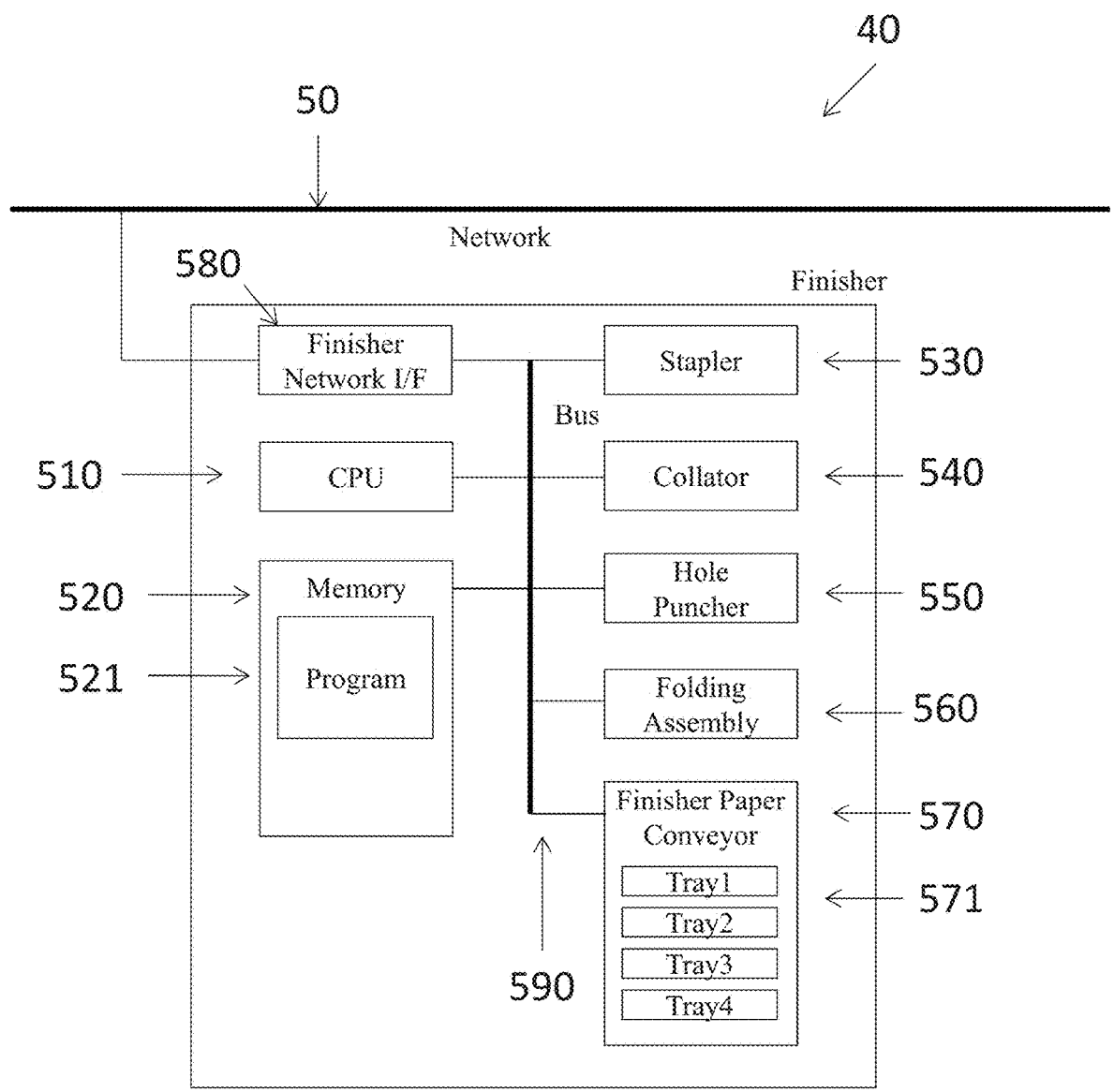
FIG. 6 is an illustration of a finisher in accordance with an exemplary embodiment.

FIG. 6 is an illustration of a finisher 40a, 40b in accordance with an exemplary embodiment. As shown in FIG. 6, the finisher 40a, 40b can include a network interface (I/F) 580, which is connected to the communication network (or network) 50, a processor or central processing unit (CPU) 510, and one or more memories 520 for storing software programs and data (such as files to be printed) 521. The processor or CPU 510 carries out the instructions of a computer program, which operates and/or controls at least a portion of the functionality of the finisher 40a, 40b. The finisher 40a, 40b can also include a stapler 530, a collator 540, a hole puncher 550, a folding assembly 560, and a finisher paper conveyor 570, which includes a plurality of trays 571. A bus 590 can connect the various components 510, 520, 530, 540, 550, 560, 570, and 580 within the finisher 40a, 40b. The finisher 40a, 40b also includes an operating system (OS), which manages the computer hardware and provides common services for efficient execution of various software programs.

The CPU 510 can also include an operating system (OS), which acts as an intermediary between the software programs and hardware components within the multifunctional printer. The operating system (OS) manages the computer hardware and provides common services for efficient execution of various software applications. In accordance with an exemplary embodiment, the network I/F 580 performs data transfer with the server or client 10, and the one or more printer or multifunctional printers 30a, 30b.

Figure 7:
FIG. 7 is a table of data obtained from a plurality of printers or multifunctional printers (MFPs) in accordance with an exemplary embodiment.

FIG. 7 is a table of data (i.e., a data set) 700 obtained from a plurality of multifunctional printers (MFPs) 30a, 30b in accordance with an exemplary embodiment. As shown in FIG. 7, for example, the one or more multifunctional printers (MFPs) 30a, 30b, and the data or metrics f1, f2 . . . fn, which form the data set 700, can include, for example, number of scans, color to black and white ration (i.e., percentage color scan), ratio of duplex/single side printing (i.e., percentage duplex), power consumption, toner levels, finishing (i.e., staples, etc.), security settings, print drum status metric, which can be used to categorize the similarity between two or more printers or multifunctional printers (MFPs) 30a, 30b. In accordance with an exemplary embodiment, the data (or data set) 700 can be obtained over a set or predetermined period of time, for example, hourly, daily, weekly, and/or monthly. The data (or data set) 700 can then be compared to corresponding data over a same or similar period of time.

In accordance with an exemplary embodiment, the data from the one or more printers or multifunctional printers (MFPs) 30a, 30b, and/or the one or more finishers 40a, 40b, can include both dynamic data (i.e., constant changing) and static data (i.e., data which is not constantly changing) on both the one or more printers or multifunctional printers 30a, 30b, and/or the one or more finishers 40a, 40b, and the nodes 70a, 70b in which the one or more printers or multifunctional printers (MFPs) 30a, 30b, and/or one or more finishers 40a, 40b, are located.

In accordance with an exemplary embodiment, the dynamic data from the one or more printers or multifunctional printers (MFPs) 30a, 30b, and/or the one or more finishers 40a, 40b can include, for example, number of pages printed, number of pages scanned, number of pages faxed, number of pages copied, and corresponding data, for example, types of pages printed, black and white (i.e., or monochrome), color, or photo, and duplex, and power usage. In addition, data on the one or more finishers 40a, 40b can be tabulated (or obtained), for example, based on the type of finisher used, for example, a stapler 530, a collator 540, a hole puncher 550, a folding assembly 560, and/or a finisher paper conveyor 570.

In accordance with an exemplary embodiment, static information can be obtained on each of the one or more printers or multifunctional printers (MFPs) 30a, 30b, and/or one or more finishers 40a, 40b. For example, the static data on the one or more printers or multifunctional printers (MFPs) 30a, 30b, and/or the one or more finishers 40a, 40b can include number of printers or multifunctional printers (MFPs) 30a, 30b, number of finishers 40a, 40b, and corresponding features of the one or more printers or multifunctional printers (MFPs) 30a, 30b, and/or the one or more finishers 40a, 40b, for example, available printer control languages, print speed of each of the one or more printers or multifunctional printers (MFPs) 30a, 30b, print modes for each of the one or more printers or multifunctional printers (MFPs) 30a, 30b, for example, monochrome, color and/or photo printer, capacity or page yield per printer or multifunctional printer 30a, 30b, costs per page for each of the one or more printers or multifunctional printers (MFPs) 30a, 30b, and/or type or model of printer, for example, virtual printer, barcode printer, 3D printer, wireless printer.

In addition, corresponding static data can be obtained on the SMBs represented by nodes 70a, 70b, for example, the type of business or industry in which the customer or consumer operates, for example, print shop, automotive, insurance, legal, and/or customer service, and corresponding information on the node 70a, 70b, for example, number of employees, geographical locations, number of offices, number of buildings, etc.

As set forth above, the usage data is preferably obtained directly from the one or more printers or multifunctional printers (MFPs) 30a, 30b, and/or the one or more finishers 40a, 40b from jobs executed on the one or more printers or multifunctional printers (MFPs) 30a, 30b, and/or the one or more finishers 40a, 40b. In a preferred embodiment, the usage data is sent to the server or client device 10 in real time (i.e., at the actual time during which the process or event occurs) for processing by the sales program (or recommendation engine) 221. However, the usage data can be saved in the memory of the one or more printers or multifunctional printers (MFPs) 30a, 30b, and/or the one more or finishers 40a, 40b, and retrieved at a later time, for example, by a service technician.

Figure 8:
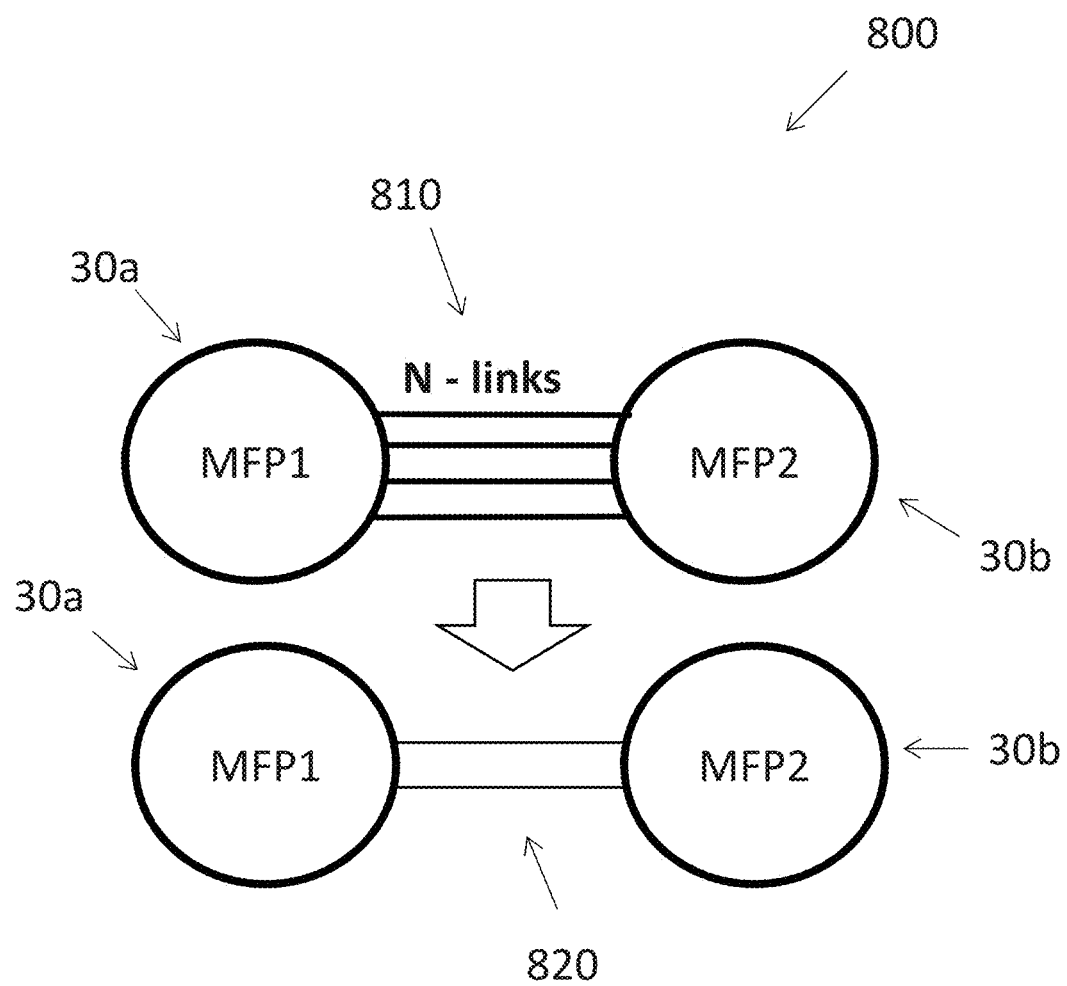
FIG. 8 is an illustration of data obtained from FIG. 7, which has been converted to links between MFPs and a corresponding effective interaction between MFPs based on a weighted interaction.

FIG. 8 is an illustration of data 800 obtained from FIG. 7, which has been converted to links 810 between the one or more printers or multifunctional printers (MFPs) 30a, 30b, for example, multifunctional printers (MFPs), and a corresponding effective interaction between one or more printers or multifunctional printers (MFPs) 30a, 30b, for example, the multifunctional printers (MFPs) based on a weighted interaction 820. In accordance with an exemplary embodiment, as shown in FIG. 8, the tabular data as shown in FIG. 7 normally analyzed with relational database methods can be converted to linked nodes 70a, 70b (for example, to a graph) in order to utilize graph machine learning (ML) techniques.

In accordance with an exemplary embodiment, the links 80a, 80b between the multifunctional printer (MFP) nodes 70a, 70b can be established by comparing their usage statistics (FIG. 7) which can be downloaded or pushed, for example, from the small to medium sized business (SMB) to a server or client device 10, for example, hosted by Konica Minolta.

In accordance with an exemplary embodiment, a method is developed to map the level of similarity of usage statistic across a set of metrics (see FIG. 7, where the usage statistics are abbreviated as f1, f2, etc.) to a total strength, denoted W, with each individual metric weighted by a parameter $\alpha_i$ where i indexes the ith metric.

In addition to dynamic streaming data from the MFPs 30a, 30b, a more slowly changing database exists of the properties of the small to medium sized businesses (SMBs) which may include, for example, the company name, its number of employees, its industry, its geographic location. In a similar fashion to the establishment of links 80a, 80b between the MFP nodes 70a, 70b, this static (or less quickly changing) database can be used to establish links 80a, 80b between small to medium sized business (SMB) nodes 70a, 70b. These links 80a, 80b can then result in groups or communities of SMB nodes 70a, 70b (types of companies with similar printer usage needs). In accordance with an exemplary embodiment, the links between the small to medium sized businesses (SMBs) can have a composite strength U 82a, 82b (FIG. 1) which is composed of the individual characteristic similarity strengths, denoted $\beta_j$, where j is the jth small to medium-sized business (SMB) characteristic. In accordance with an exemplary embodiment, the strength U 82a, 82b, can be a number, for example, 0.2 (82a) or 6.6 (82b) in which the higher the number the stronger the relative link between the two corresponding nodes, for example, nodes D and E have a stronger link than nodes C and F.

In accordance with an exemplary embodiment, the system and method as disclosed can be composed of a multi-step machine learning system which can determine, for example, the strength of the multiple links 810 between the MFPs 30a, 30b and directly measures the similarity of the usage of that particular metric. For example, in accordance with an exemplary embodiment, the number of links N can be equal to the number of printer metrics (for example, with N equal to 5 or more, and more particularly, wherein N is equal to 5 to 25, for example, wherein N is equal to 5 to 15, for example, N=10). In addition, the overall printer to printer or MFP-to-MFP similarity can be a weighted sum 820 of the N-links as shown in the following equation, wherein importance of the corresponding link is denoted $\alpha_i$, and the similarity of the usage of the particular metric can be learned, for example, by a machine learning system and program denoted by $w_1$.

$$w = \sum_{i=1}^{N} \alpha_i w_i(f)$$

In accordance with an exemplary embodiment, the data, which can be dynamic (i.e., usage data) or static (non-usage data), from the one or more printers or multifunctional printers (MFPs) 30a, 30b, the one or more finishers 40a, 40b, and/or other equipment or devices (not shown), for example, a device that can provide small to medium-sized businesses (SMB) (i.e. node 70a, 70b) with printing, copying and scanning to email, custom applications, and integration with public cloud provides, with full service internet technology (IT) including email, backup, data recovery, and network security, for example, a Workplace Hub® by Konica Minolta, which belong to a small to medium-sized business (SMB) can be graphed.

Figure 9:
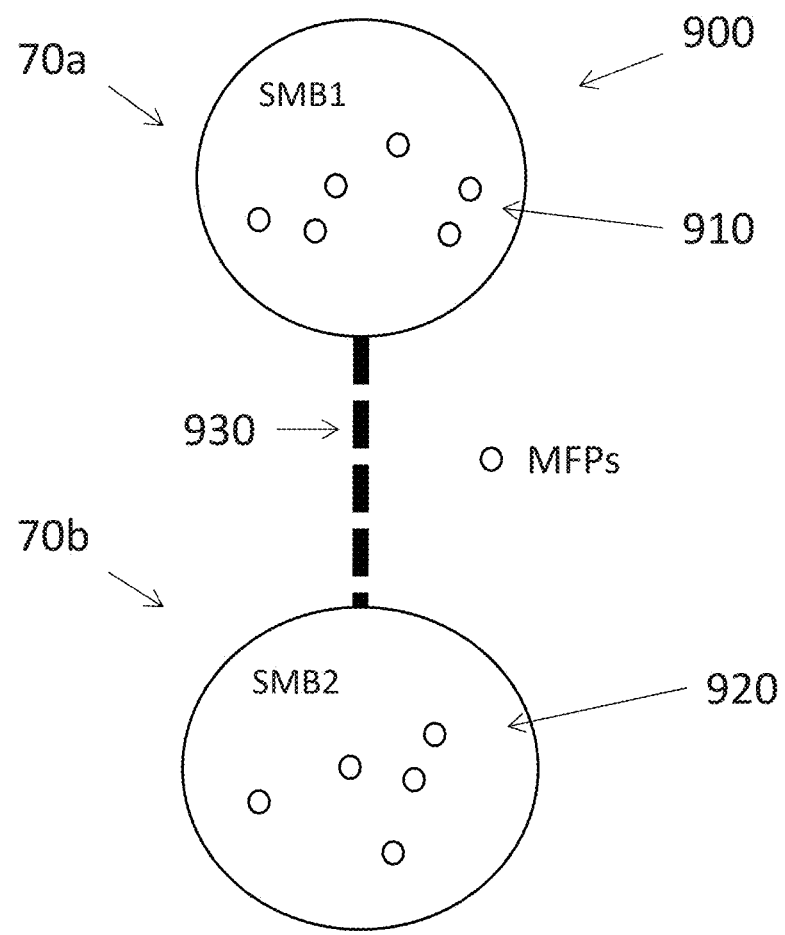
FIG. 9 is an illustration of a data mapping between two companies or businesses in accordance with an exemplary embodiment.

FIG. 9 is an illustration of a data mapping 900 between two companies or businesses (i.e., nodes 70a, 70b) in accordance with an exemplary embodiment. As shown in FIG. 9, in accordance with an exemplary embodiment, the data 910, 920 from each company or business 70a, 70b, for example, a small to medium-sized business (SMB) can be connected to all other SMBs in its own graph where the links 930 between the companies or businesses (for example, SMBs) 70a, 70b incorporate both the evaluated similarity of printer or MFP usage as well as other metrics such as company industry, company size, revenue, geographic area, etc. In accordance with an exemplary embodiment, the two companies or businesses 70a, 70b, are in a same or similar industry, and their corresponding purchases will also be the same or similar.

As shown in FIG. 9, for example, data 910 from the one or more printers or multifunctional printers (MFPs) 30a, 30b, or alternatively, the one or more finishers 40a, 40b, can be collected in (near) real time such that updated graphs of the printing system, for example, in a node 70a, 70b, which can be a company or business, for example, a print shop or small to medium-sized business (SMB) can be used to make the graphical system dynamic. For example, nodes 910, 920 in the customer or business graph (i.e., graph), for example, retrieved from a small to medium-sized businesses (SMB) (i.e., nodes 70a, 70b), can be composed themselves of internal graphs of MFPs 30a, 30b. Further, the nodes 910, 920 in the community structure graph can be composed of internal graphs of customers or businesses, for example, from a plurality of small to medium sized businesses (SMBs). In accordance with an exemplary embodiment, at each stage, for example as shown in FIG. 1, complex links 80a, 80b (or edges) can be introduced between nodes 70a, 70b and the strength of the links 80a, 80b can be determined by the weighted sum of the sub-link components which can themselves be learned in the back-propagation process.

Figure 10:
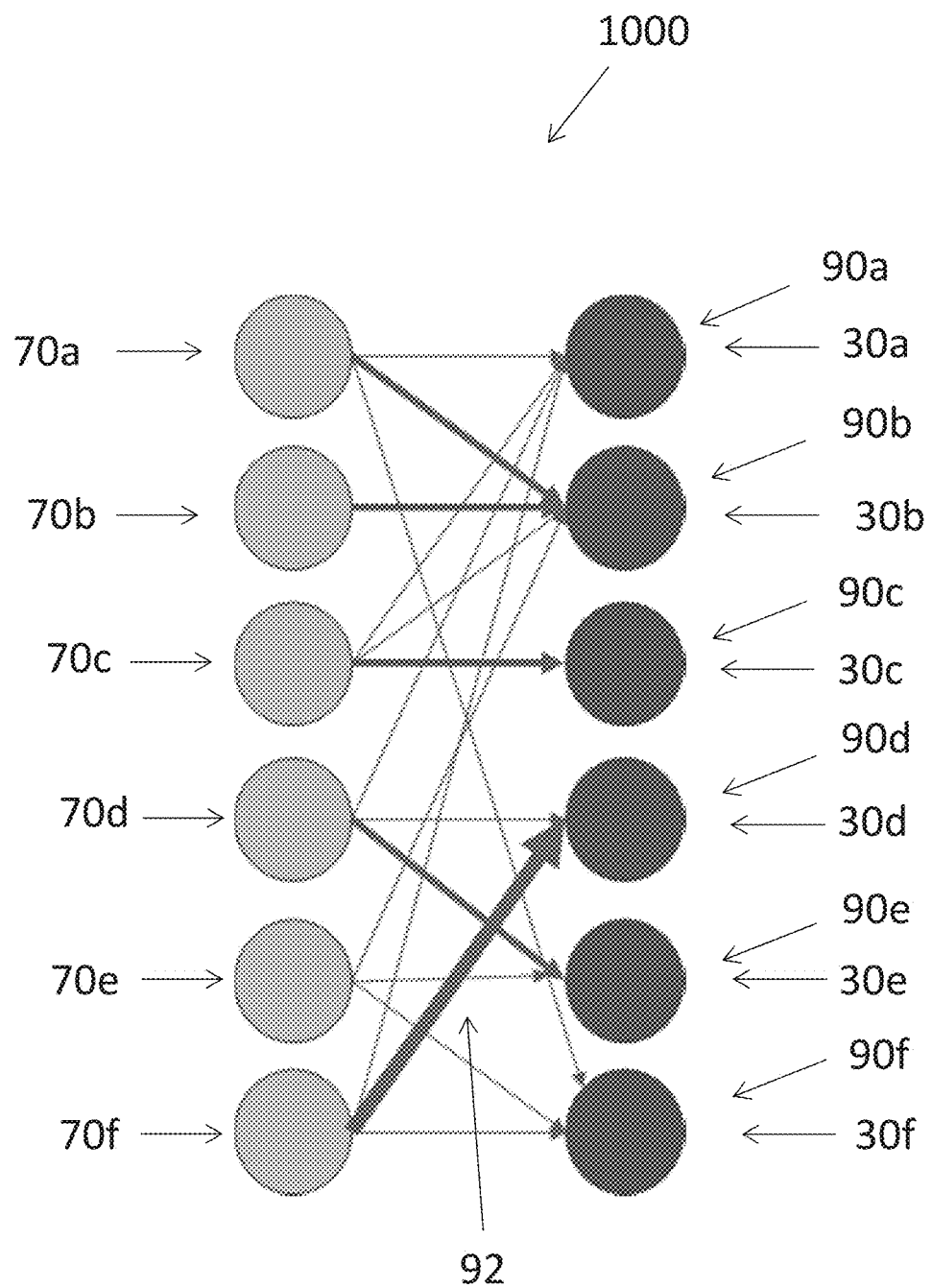
FIG. 10 is an illustration of a bipartite graph with product and/or sales recommendations in accordance with an exemplary embodiment.

FIG. 10 is an illustration of a bipartite graph 1000 with product and/or sales recommendations in accordance with an exemplary embodiment. As shown in FIG. 10, the nodes (or customer nodes) 70a, 70b, 70c, 70d, 70e, 70f, can be small and medium sized businesses (SMB), which buy or purchase the products 90a, 90b, 90c, 90d, 90e, 90f, which can be, for example, multifunctional printers (MFPs) 30a, 30b, 30c, 30d, 30e, 30f of multiple types. In accordance with an exemplary embodiment, each arrow from the node 70a, 70b, 70c, 70d, 70e, 70f (i.e., small to medium sized business) to the products 90a, 90b, 90c, 90d, 90e, 90f, for example, a multifunctional printer (MFP) 30a, 30b, 30c, 30d, 30e, 30f indicates a purchase at some point in time of that multifunctional printer (MFP) 30a, 30b, 30c, 30d, 30e, 30f. Thicker arrows 92 indicate purchase of more than one unit of that particular multifunctional printer (MFP) type 30a, 30b, 30c, 30d, 30e, 30f. In accordance with an exemplary embodiment, the recommender system based on graphs is configured to predict at some future time a link 80a, 80b, between a customer 70a, 70b, 70c, 70d, 70e, 70f and a product 90a, 90b, 90c, 90d, 90e, 90f, (or a thickening link for purchase of an additional unit of a previously purchased MFP type 30a, 30b, 30c, 30d, 30e, 30f). In accordance with an exemplary embodiment, rather than a product, for example, a MFP 30a, 30b, 30c, 30d, 30e, 30f, the product can be a service, for example, sending a technician to a printer or MFP 30a, 30b, 30c, 30d, 30e, 30f, for servicing.

In accordance with an exemplary embodiment, each of the nodes 70a, 70b, 70c, 70d, 70e, 70f, can be a small to medium sized business, which can include details about the small to medium sized business, for example, name, industry, number of employees, location, revenue, and printer data, for example, number of scans, etc. In accordance with an exemplary embodiment, the products 90a, 90b, 90c, 90d, 90e, 90f can be various types of printers or multifunctional printers 30a, 30b, 30c, 30d, 30e, 30f, for example, Konica Minolta products including color multifunctionals, for example, bizhub C227, bizhub C258, bizhub C287, and bizhub C308; black and white (B&W) multifunctionals, for example, bizhub 227, bizhub 287, and bizhub 308e; and compact multifunctionals, for example, bizhub 28e, bizhub 4050, and bizhub 4750.

Figure 11:
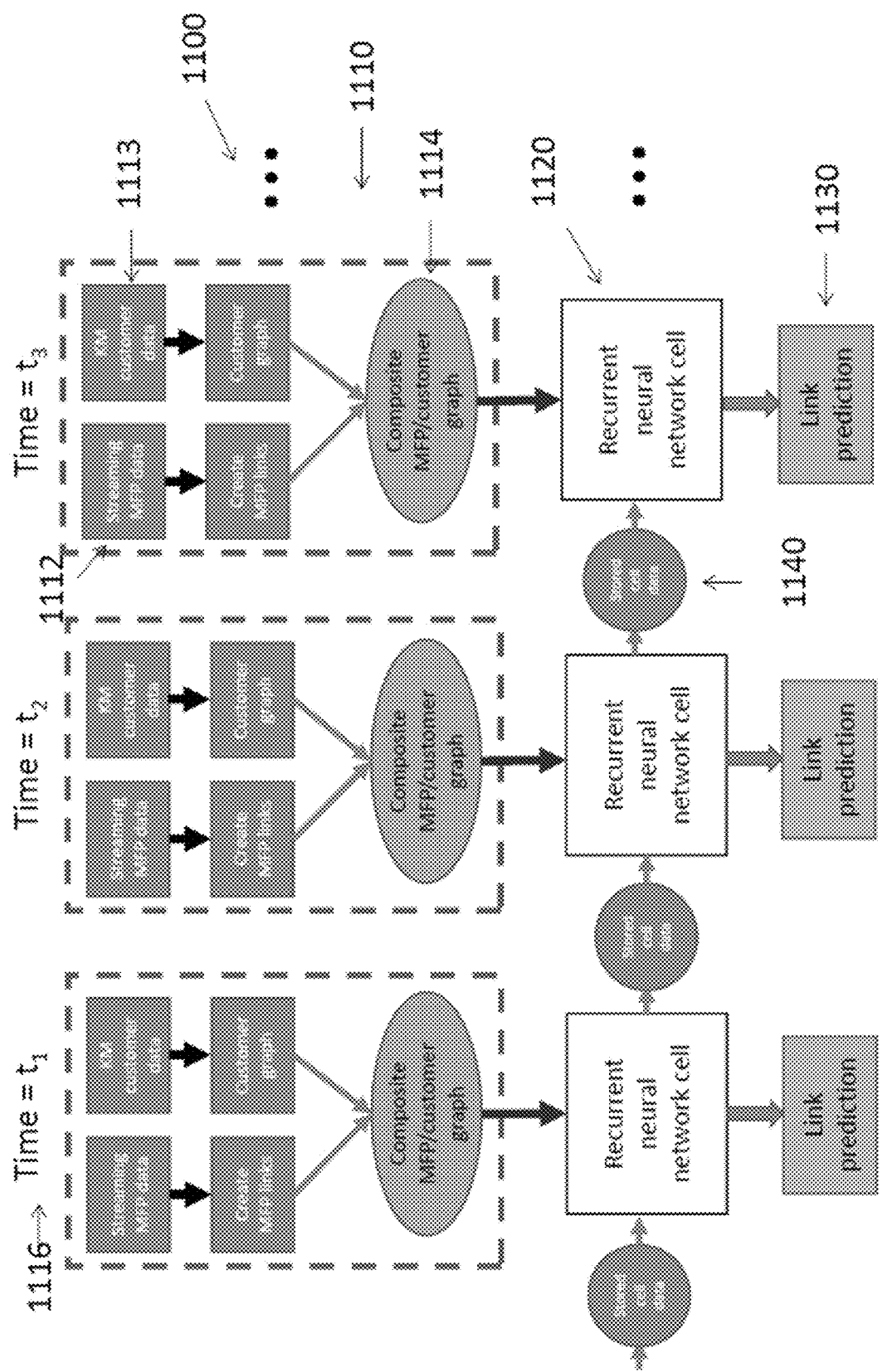
FIG. 11 is an illustration of a flowchart for operation of a recommender system in accordance with an exemplary embodiment.

FIG. 11 is an illustration of a flowchart 1100 for operation of a recommender system in accordance with an exemplary embodiment. As shown in FIG. 11, a recurrent neural network is shown, which at successive instants in time 1116 (for example, Time=$t_1$, Time=$t_2$, Time=$t_3$, . . . ) takes input of data (dashed boxes) 1110 and predicts output in the form of a link prediction 1130. In accordance with an exemplary embodiment, for example, the input data is a composite graph 1114, as described above, which combines the dynamic, streaming printer data 1112 and the static (or slowly changing) data 1113 on the nature of the small to medium sized businesses (SMBs). For times before the present, there exists "ground truth" data (i.e., stored cell data) 1140 which is simply the actual purchases of the varying MFP models that have already been made before now. Thus, the method as shown in FIG. 11, when operating across a time in the past, can predict MFP 30a, 30b purchases which may or may not have actually been made. The accuracy of those predictions is used in a back-propagation scheme to adjust the parameters of the method (for example, the α's and β's and the other weights internal to the neural network). The method can then be used to predict MFP 30a, 30b needs by a node 70a, 70b, for example, a small to medium sized businesses (SMBs) going forward into the future. In accordance with an exemplary embodiment, refinements of the parameters proceed continuously as new purchase data is obtained.

As shown in FIG. 11, in accordance with an exemplary embodiment, a graphical neural network 1120 can then employed to embed the graph 1114 into a lower dimensional space and perform community detection 1120. That is, the set of graph nodes, for example, representing customers or businesses such as small to medium-sized businesses (SMBs), will, under a graph community detection algorithm 1120, cluster into regions, for example, with similar demographic, economic and printer usage characteristics. In accordance with an exemplary embodiment, the community detection algorithm can be, for example, a deep fully connected neural network or a recurrent neural network (RNN) cell. In accordance with an exemplary embodiment, each of the regions (or clusters) corresponds to areas in which a corresponding recommendation can be made to the company or business to purchase products and/or services 90a, 90b, 90c, 90d, 90e, 90f (FIG. 10).

In accordance with an exemplary embodiment, the graph embedding can also identify which nodes 70a, 70b, for which customers or businesses, for example, which small to medium sized businesses (SMBs), for example, purchased upgrades of new equipment at which stage of development. In accordance with an exemplary embodiment, the actual purchase data (or "ground truth" data) which is comprised of the purchase history of a node 70a, 70b, for example, a new printer or a multifunctional printer (MFP) 30a, 30b, which can be used in a back-propagation algorithm to learn the weights of the printer metrics, the weights of the customer or business similarity terms, for example, small to medium-sized business (SMB) similarity terms, and the weights of each of the customer or business similarity terms in the neural network which embeds the customer or business graph.

In addition, statistical similarity measures can be employed to determine which clusters correspond most closely to which equipment-need cases. The network thus can effectively determine, for example, the "ideal" equipment portfolio for each cluster and suggest which equipment should be purchased (and which already-purchased equipment might be superfluous) by each customer or business, for example, for a small to medium-sized business. In accordance with an exemplary embodiment, for example, the ideal equipment portfolio can be a recommendation for the sales team to approach the customer or business with a sales proposal to meet, for example, changing needs of the company or business.

In accordance with an exemplary embodiment, the data and corresponding metrics as disclosed herein can be sent to the server or client 10 in real time (i.e., at the actual time during which the process or event occurs) for processing by the sales program (or recommendation engine) 221. However, the usage data can be saved in the memory of the one or more printers or multifunctional printers (MFPs) 30a, 30b, and/or the one more or finishers 40a, 40b, and retrieved at a later time, for example, by a service technician. In addition, and/or alternatively, the sales program (or recommendation engine) 221 can be hosted on the one or more of the printers or multifunctional printers (MFPs) 30a, 30b, and wherein each of the server or client 10 and/or the one or more of the printers or multifunctional printers (MFPs) 30a, 30b can be configured to display the sales recommendations, for either a product or service 90a, 90b, 90c, 90d, 90e, 90f, on the graphical user interface (GUI) of any of the server or client 10, and/or the one or more of the printers or multifunctional printers (MFPs) 30a, 30b.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recommending products based on usage of one or more multifunctional printers, the method comprising:
    collecting usage data from a multifunctional printer;
    classifying the usage data from the multifunctional printer into one or more categories;
    comparing the usage data from the multifunctional printer in each of the one or more categories to usage data from one or more other multifunctional printers, wherein the comparing of the usage data from the multifunctional printer in each of the one or more categories to usage data from the one or more other multifunctional printers comprises:
        graphing the usage data from the multifunctional printer;
        graphing the usage data from one or more other multifunctional printers; and
        employing a graphical community detection algorithm to cluster the usage data from the multifunctional printer and the usage data from the one or more other multifunctional printers into clusters having similar demographic, economic and/or multifunctional printer usage characteristics;
    determining one or more usage patterns for the multifunctional printer from the comparison of the usage data between the multifunctional printer in each of the one or more categories to the usage data from one or more other multifunctional printers;
    identifying one or more products or services based on the one or more usage patterns for the multifunctional printer; and
    recommending one or more products or services for the multifunctional printer based on the identified one or more products or services through a graphical user interface (GUI).

2. The method according to claim 1, further comprising:
    collecting the usage data in real time from the multifunctional printer;
    collecting non-usage data about a business or customer at predetermined intervals; and
    incorporating the non-usage data about the business or customer into the determination of the one or more usage patterns for the multifunctional printer.

3. The method according to claim 1, further comprising:
    calculating a similarity between the one or more multifunctional printers and the one or more other multifunctional printers by incorporating a weighted sum of common usage data between the multifunctional printer and common usage data from the one or more multifunctional printers.

4. The method according to claim 1, wherein the graphical community detection algorithm is a deep fully connected neural network or a recurrent neural network cell.

5. The method according to claim 1, wherein the identification of the one or more products or services based on the one or more usage patterns for the multifunctional printer comprises:
    using purchase patterns from customers or businesses that have actually purchased the one or more products or services; and
    identifying the one or more products or services by a bipartite matching algorithm.

6. The method according to claim 1, wherein the usage data includes one or more of the following:
    a number of pages printed, a number of pages scanned, a number of pages faxed, and a number of pages copied.

7. The method according to claim 1, wherein the identification of the one or more products or services based on the one or more usage patterns for the multifunctional printer comprises:
    identifying one or more customers or businesses having a similar usage pattern of the multifunctional printer; and
    recommending the one or more products or services based on purchase by the one or more customers or businesses having the similar usage pattern of the multifunctional printer.

8. The method according to claim 1, wherein the recommendation of the one or more products or services for the multifunctional printer is a new printer, for service by a technician, and/or replacement of one or more parts of the multifunctional printer.

9. The method according to claim 1, wherein the recommendation of the one or more products or service for the multifunctional printer based on the identified one or more products or services on a graphical user interface, comprises:
    using a bipartite graph to select the recommendations for the one or more products or services for the multifunctional printer.

10. The method according to claim 1, further comprising:
    displaying the recommendation on the graphical user interface (GUI) of a server, the multifunctional printer, or a client device.

11. A non-transitory computer readable medium (CRM) storing computer program code executed by a computer processor that performs a process for recommending products based on usage of one or more multifunctional printers, the process comprising:
    collecting usage data from a multifunctional printer;
    classifying the usage data from the multifunctional printer into one or more categories;
    comparing the usage data from the multifunctional printer in each of the one or more categories to usage data from one or more other multifunctional printers, wherein the comparing of the usage data from the multifunctional printer in each of the one or more categories to usage data from the one or more other multifunctional printers comprises:

graphing the usage data from the multifunctional printer;
graphing the usage data from one or more other multifunctional printers; and
employing a graphical community detection algorithm to cluster the usage date from the multifunctional printer and the usage data from the one or more other multifunctional printers into clusters having similar demographic, economic and/or multifunctional printer usage characteristics, and wherein the graphical community detection algorithm is a deep fully connected neural network;
determining one or more usage patterns for the multifunctional printer from the comparison of the usage data between the multifunctional printer in each of the one or more categories to the usage data from one or more other multifunctional printers;
identifying one or more products or services based on the one or more usage patterns for the multifunctional printer; and
recommending one or more products or services for the multifunctional printer based on the identified one or more products or services through a graphical user interface (GUI).

12. The non-transitory computer readable medium according to claim 11, further comprising:
calculating a similarity between the one or more multifunctional printers and the one or more other multifunctional printers by incorporating a weighted sum of common usage data between the multifunctional printer and common usage data from the one or more multifunctional printers.

13. A method for recommending products based on usage of one or more multifunctional printers, the method comprising:
collecting usage data from a multifunctional printer;
casting the usage data from the multifunctional printer into a form of a graph with nodes and edges representing features of the multifunctional printer and relationships between the features of the multifunctional printer;
graphing usage data from one or more other multifunctional printers; and
employing a graphical community detection algorithm to cluster the usage data from the multifunctional printer and the usage data from the one or more other multifunctional printers into clusters having similar demographic, economic and/or multifunctional printer usage characteristics.

14. The method according to claim 13, further comprising:
incorporating usage data from one or more multifunctional printers in different industries and businesses into the graph for prediction of usage patterns based on the different industries and businesses; and
anticipating future multifunctional printer requirements based on the usage data from the one or more multifunctional printers in the different industries and businesses and categorizing the usage data from the one or more multifunctional printers from the different industries and businesses related to a business size, a geographic location, and/or an employee profile.

15. The method according to claim 13, further comprising:
incorporating non-usage data about a business or customer into a determination of one or more usage patterns for the multifunctional printer.

16. The method according to claim 13, further comprising:
calculating a similarity between the multifunctional printer and the one or more other multifunctional printers by incorporating a weighted sum of common usage data between the multifunctional printer and common usage data from the one or more multifunctional printers, and wherein the similarity between the multifunctional printer and the one or more other multifunctional printers includes a functional relationship of usage within an industry, a company size, an employee profile, and/or a geographic location.

17. The method according to claim 13, wherein the graphical community detection algorithm is a deep fully connected neural network.

18. The method according to claim 17, further comprising:
graphing convolutional neural networks designed to allow the graph to learn, in an unsupervised manner, features of nodes and a relationships between nodes for which data has not been collected in order to identify redundancies in printing resources and/or to make further resource recommendations.

19. The method according to claim 13, comprising:
creating a bipartite graph of users and products, distinct from the graph of usage characteristics of the multifunctional printer, the bipartite graph of users and products configured to allow for identification of users with products based on a bipartite matching algorithm.

20. The method according to claim 13, further comprising:
displaying the recommendation on the graphical user interface (GUI) of a server, the multifunctional printer, or a client device.

* * * * *